Oct. 18, 1966     W. E. MOHR     3,279,772

HUMIDIFIER EVAPORATIVE PLATE

Filed July 1, 1964

INVENTOR
WILLARD E. MOHR

BY
Robert Henderson

ATTORNEY

3,279,772
HUMIDIFIER EVAPORATIVE PLATE
Willard E. Mohr, 2909 Don Lee Court,
Des Moines, Iowa
Filed July 1, 1964, Ser. No. 379,627
8 Claims. (Cl. 261—104)

This invention pertains to asbestos products and particularly to a product having a capillary action and an absorption rate making it particularly suitable for use in making humidifier evaporator plates for hot air furnaces.

It has been determined that a relative humidity of 35 to 45% is the ideal range of atmospheric humidity at a room temperature of 70 to 72° F. To provide humidifier evaporative plates for maintaining such a range, the present day materials are either too expensive, or too brittle, or insufficiently porous per unit of volume.

It is, therefore, an object of this invention to provide a new and novel humidifier evaporative plate.

It is another object of this invention to provide a humidifier evaporative plate which possesses sufficient wet strength to be self-sustaining when saturated with water, and which has a high capillarity to provide a high rate of water absorption and evaporation.

Still another object of this invention is to provide a humidifier evaporative plate having a high porosity and water absorption rate which is economical, and which is sufficiently rugged to withstand handling, packaging, and transporting procedures without serious damage.

These objects, and other features and advantages of this invention will be readily appreciated upon reference to the following description, when taken in conjunction with the accompanying drawings, wherein.

Figure 1:
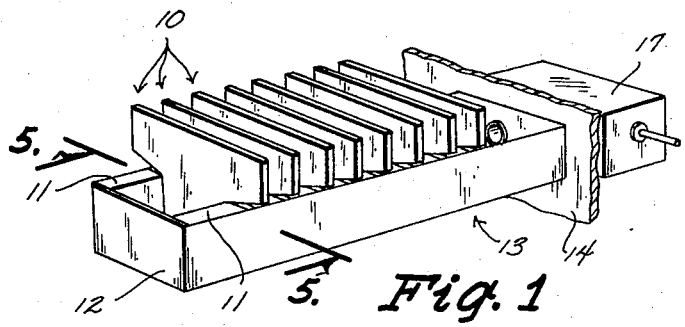
FIG. 1 is a perspective view of a humidifying unit for a hot air furnace, a fragment of a panel of the furnace plenum chamber showing, and with a plurality of humidifier evaporative plates of this invention being supported in the unit.

Referring now to the drawings, the refractory product of this invention is shown particularly in the formation and shape of a plate indicated generally at 10. A plurality of the plates 10 are supported on the upper side flanges 11 of the water pan 12 of a commercially available humidifier unit, indicated generally at 13.

Figure 5:
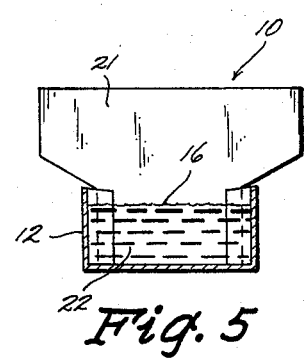
FIG. 5 is a sectional view taken along the line 5—5 in FIG. 1.

The unit 13 is shown mounted on the wall 14 of a hot air furnace, with the water pan 12 extended into a plenum chamber of the furnace, and with water 16 (FIG. 5) automatically fed into the pan 12 by a float chamber 17. To supply moisture to the hot air passing by the pan 12 on its way to the hot air ducts, a plurality of the plates 10 are inserted into the pan.

Figure 2:
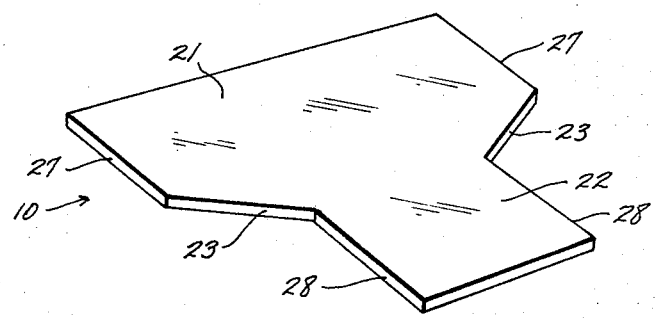
FIG. 2 is an enlarged perspective view of one plate.
Figure 3:
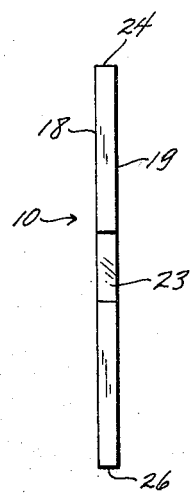
FIG. 3 is a view taken from either side of the plate of FIG. 2.
Figure 4:
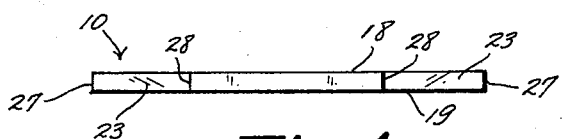
FIG. 4 is an end elevational view of the plate of FIG. 2.

Each plate 10 is formed with a thickness of approximately ¼″, having flat, parallel top and bottom surfaces 18 and 19 (FIGS. 3 and 4) and with a head portion 21 (FIG. 2) and a stem portion 22. The stem portion 22 is considerably less in width than the head portion 21, due to a pair of shoulders 23 tapering away from the head portion 21 in a converging manner. The upper and lower ends 24 and 26, respectively are straight and parallel, as are the side edges 27 and 28, respectively, of the head and stem portions.

The instant invention is particularly directed to the utilization of the product having the hereinafter described physical characteristics and chemical properties as a humidifier evaporative plate. The plates themselves are made by conventional methods, using a brick kiln for baking purposes. The T-shaped plates 10 are cut from a brick of sufficient size to provide the desired shape, although it is conceivable that the exact shape could be produced, with only the slicing operation remaining.

The chemical analysis of the product comprising a plate 10 consists, by weight, essentially of 57.0 to 60.0% of silica ($SiO_2$), 33.0 to 36.0% of alumina ($Al_2O_3$), 1.0 to 2.0% of iron oxide ($Fe_2O_3$), 1.4 to 2.0% lime (CaO), 0.1 to 0.6% magnesia (MgO), 1.5 to 2.5% titania ($TiO_2$), and 1.0 to 2.0% alkalies ($Na_2O+K_2O$). The chemical analysis was made in accordance with A.S.T.M. C 18.

In checking various physical properties of the product of which the plates 10 are made, it was found, in accord with A.S.T.M. C 20 that the apparent porosity of 67 to 77% was provided. By A.S.T.M. C 134, a bulk density of 39.5 to 42.5 pounds per cubic foot is had, and by A.S.T.M. C 93, the modulus of rupture was 75 to 140 pounds per square inch.

A cold crushing strength test under A.S.T.M. C 93 provision showed 90 to 160 pounds per square inch. The thermal conductivity in terms of B.t.u. per square foot per hour per degree F. per inch thickness at a mean temperature of 400° F. is 1.50, at 800° F. is 1.68, at 1200° F. is 1.92, and at 1600° F. is 2.18.

The plates 10 as depicted in the assembly arrangement of FIG. 1 were tested under varying conditions. The test equipment included a natural gas furnace rated at 85,000 B.t.u., a 20 x 18 plenum equipped with an air flow meter, a 6′ x 4″ diameter water stand pipe with sight tube, a squirrel cage air flow fan, standard 0° to 150° thermometers, and a sling psychrometer.

Of nine plates 10 tested, their average dry weight was 2.27 ounces, average wet weight of 4.25 ounces, with a total absorption of 1.98 ounces per plate. This test was accomplished with the lower three-quarter inch end of the stem portion 22 (FIG. 5) submerged in 65° F. water for one minute.

A plurality of fifteen plates 10 were placed in the pan 12 and two runs were made under a pair of different conditions. The runs made under Test Conditions A, with the results shown in the accompanying chart, were made with the furnace running continually for the indicated periods of time; whereas the runs made under Test Conditions B were made with intermittent furnace operation as specified.

| | Plenum Temp., °F. | Dry Bulb, °F. | Wet Bulb, °F. | Rel. Hum., percent | Air Vol., f.p.m. | Absorption Rate (oz. per hr.) |
|---|---|---|---|---|---|---|
| Test Conditions A (Continuous): | | | | | | |
| Run I—Recorded hourly, 20 hr. avg. | 145 | 86 | 73 | 54 | 1,000 | 21.3 |
| Run II—Recorded hourly, 11 hr. avg. | 170 | 75 | 62 | 48 | 1,100 | 30.2 |
| Test Conditions B (Intermittent [1]): | | | | | | |
| Run I—Recorded hourly, 19 hr. avg. | [2] 145 | 78 | 62 | 41 | 750 | 17.2 |
| Run II—Recorded hourly, 18 hr. avg. | [2] 170 | 75 | 57 | 33 | 750 | 20.4 |

[1] 5 minute furnace operation with two minute additional fan operation, then off for 3 minutes (6 cycle/hr.).
[2] Plenum temperature during furnace operation only. Fan cut-off controlled by time.

It is to be appreciated that the invention is not limited to the particular T shape of the plate 10, and that the test results could well vary slightly should the shape vary.

Of importance, the results of the tests, when compared to other commercially available plates used for the same purpose and tested under the same conditions, showed the inventive product to have a far superior absorption and evaporative rate thereover.

It is to be remembered that although a preferred embodiment of the invention has been described herein, various changes and modifications may be made thereto without departing from the true spirit and scope of the invention as defined in the appended claims.

I claim:

1. A humidifier evaporative plate having a stem portion and a head portion, said plate being supported with said stem portion inserted into a supply of water to wick the water to said head portion, said plate comprised of a relatively thin material and weighing 2.27 ounces dry, said plate having an apparent porosity of 67 to 77%, a bulk density of 39.5 to 42.5 pounds per cubic foot, a modulus of rupture of 75 to 140 pounds per square inch, a cold crushing strength of 90 to 160 pounds per square inch, and a thermal conductivity at a mean temperature of 400° F. of 1.50.

2. A humidifier evaporative plate having a stem portion and a head portion, said plate being supported with said stem portion inserted into a supply of water to wick the water to said head portion, said plate comprised of a relatively thin material and weighing 2.27 ounces dry, said plate having an apparent porosity of 67 to 77%, a bulk density of 39.5 to 42.5 pounds per cubic foot, a modulus of rupture of 75 to 140 pounds per square inch, a cold crushing strength of 90 to 160 pounds per square inch, and a thermal conductivity at a mean temperature of 400° F. of 1.50, said plate having a total absorption of approximately 2 ounces water when said stem portion is so submerged.

3. A humidifier evaporative plate having a stem portion and a head portion, said plate being supported with said stem portion inserted into a supply of water to wick the water to said head portion, said plate having the following physical characteristics; a weight of approximately 2.27 ounces when dry, an apparent porosity of 67%, a bulk density of 39.5 pounds per cubic foot, a modulus of rupture of 75 pounds per square inch, a cold crushing strength of 90 pounds per square inch, and a thermal conductivity at a mean temperature of 400° F. of 1.50.

4. A humidifier evaporative plate having a stem portion and a head portion, said plate being supported with said stem portion inserted into a supply of water to wick the water to said head portion, said plate having the following physical characteristics; a weight of approximately 2.27 ounces when dry, an apparent porosity of 67%, a bulk density of 39.5 pounds per cubic foot, a modulus of rupture of 75 pounds per square inch, a cold crushing strength of 90 pounds per square inch, an da thermal conductivity at a mean temperature of 400° F. of 1.50, said plate having a total absorption of approximately 2 ounces water when said stem portion is so submerged.

5. A humidifier evaporative plate having a stem portion and a head portion, said plate being supported with said stem portion inserted into a supply of water to wick the water to said head portion, said plate having the following physical characteristics; a weight of approximately 2.27 ounces when dry, an apparent porosity of 77%, a bulk density of 4.5 pounds per cubic foot, a modulus of rupture of 140 pounds per square inch, a cold crushing strength of 160 pounds per square inch, and a thermal conductivity at a mean temperature of 400° F. of 1.50.

6. A humidifier evaporative plate having a stem portion and a head portion, said plate being supported with said stem portion inserted into a supply of water to wick the water to said head portion, said plate having the following physical characteristics; a weight of approximately 2.27 ounces when dry, an apparent porosity of 77%, a bulk density of 4.5 pounds per cubic foot, a modulus of rupture of 140 pounds per square inch, a cold crushing strength of 160 pounds per square inch, and a thermal conductivity at a mean temperature of 400° F. of 1.50, said plate having a total absorption of approximately 2 ounces water when said stem portion is so submerged.

7. A humidifier evaporative plate having a stem portion and a head portion, said plate being supported with said stem portion inserted into a supply of water to wick the water to said head portion, said plate having the following physical characteristics; a weight of approximately 2.27 ounces when dry, an apparent density of 72%, a bulk density of 41 pounds per cubic foot, a modulus of rupture of 97.5 pounds per square inch, a cold crushing strength of 125 pounds per square inch, and a thermal conductivity at a mean temperature of 400° F. of 1.50.

8. A humidifier evaporative plate having a stem portion and a head portion, said plate being supported with said stem portion inserted into a supply of water to wick the water to said head portion, said plate having the following physical characteristics; a weight of approximately 2.27 ounces when dry, an apparent density of 72%, a bulk density of 41 pounds per cubic foot, a modulus of rupture of 97.5 pounds per square inch, a cold crushing strength of 125 pounds per square inch, and a thermal conductivity at a mean temperature of 400° F. of 1.50, said plate having a total absorption of approximately 2 ounces water when said stem portion is so submerged.

References Cited by the Examiner

UNITED STATES PATENTS

| | | | |
|---|---|---|---|
| 3,048,163 | 8/1962 | Powers | 126—113 |
| 3,052,416 | 9/1962 | Stephen | 261—104 X |
| 3,104,660 | 9/1963 | Martin | 261—104 X |
| 3,138,470 | 6/1964 | Davies et al. | 106—65 X |
| 3,192,058 | 6/1965 | Smoot et al. | 106—65 X |

HARRY B. THORNTON, *Primary Examiner.*

T. MILES, *Assistant Examiner.*